(12) United States Patent
Saitou et al.

(10) Patent No.: US 9,481,137 B2
(45) Date of Patent: Nov. 1, 2016

(54) METHOD FOR PRODUCING PLASTIC LENS

(75) Inventors: Kiyohiro Saitou, Tokyo (JP); Hayato Kitabayashi, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 920 days.

(21) Appl. No.: 13/504,364

(22) PCT Filed: Oct. 25, 2010

(86) PCT No.: PCT/JP2010/006293
§ 371 (c)(1),
(2), (4) Date: Apr. 26, 2012

(87) PCT Pub. No.: WO2011/052177
PCT Pub. Date: May 5, 2011

(65) Prior Publication Data
US 2012/0217664 A1    Aug. 30, 2012

(30) Foreign Application Priority Data

Oct. 28, 2009  (JP) ................................. 2009-247924

(51) Int. Cl.
| | | |
|---|---|---|
| *B29D 11/00* | (2006.01) | |
| *B29C 45/56* | (2006.01) | |
| *B29L 11/00* | (2006.01) | |
| *B29C 45/26* | (2006.01) | |

(52) U.S. Cl.
CPC ............. *B29D 11/00* (2013.01); *B29C 45/561* (2013.01); *B29C 2045/2687* (2013.01); *B29L 2011/0016* (2013.01)

(58) Field of Classification Search
CPC ............... B29L 2011/0033; B29L 2011/0016; B29C 45/561; B29C 2045/2687; B29D 11/00
See application file for complete search history.

(56) References Cited

U.S. PATENT DOCUMENTS

| | | | | |
|---|---|---|---|---|
| 3,434,781 | A | * | 3/1969 | Davis .................. G02C 7/02 351/159.21 |
| 4,828,769 | A | | 5/1989 | Maus et al. |
| 4,874,561 | A | | 10/1989 | Spector |
| 5,470,892 | A | * | 11/1995 | Gupta .............. B29D 11/00961 264/1.38 |
| 6,089,710 | A | * | 7/2000 | Zeidler ................. G02C 7/02 351/159.01 |
| 6,210,610 | B1 | | 4/2001 | Saito et al. |
| 6,270,219 | B1 | | 8/2001 | Saito |

(Continued)

FOREIGN PATENT DOCUMENTS

| | | |
|---|---|---|
| GB | 2050928 A | 1/1981 |
| JP | S61-229520 A | 10/1986 |

(Continued)

OTHER PUBLICATIONS

Europe Patent Office, "Search Report for EP 10826313.8," Dec. 5, 2014.

(Continued)

*Primary Examiner* — Mathieu Vargot
(74) *Attorney, Agent, or Firm* — Manabu Kanesaka

(57) ABSTRACT

Provided is a method for producing a plastic lens, wherein, in molding a plurality of plastic lenses having different optical surface shapes simultaneously in a single mold 50, by designing cavities 3a and 3b such that each of the plastic lenses to be molded has the same volume, a plurality of plastic lenses having different optical surface shapes can be molded simultaneously in a single molding die without impairing the molding accuracy, and an injection compression molding apparatus used for such method.

7 Claims, 7 Drawing Sheets

(56) References Cited

U.S. PATENT DOCUMENTS

| | | |
|---|---|---|
| 6,499,986 B1 | 12/2002 | Saito |
| 6,616,868 B1 | 9/2003 | Gotoh et al. |
| 6,645,417 B1 | 11/2003 | Grove |
| 2006/0267226 A1 | 11/2006 | Weymouth |

FOREIGN PATENT DOCUMENTS

| | | | |
|---|---|---|---|
| JP | 08127037 A | * | 5/1996 |
| JP | H08-127037 A | | 5/1996 |
| JP | 09277327 A | * | 10/1997 |
| JP | H10-249872 A | | 9/1998 |
| JP | 2002-001742 A | | 1/2002 |
| JP | 2003-181896 A | | 7/2003 |
| TW | 200518909 A | | 6/2005 |
| WO | 98/26707 A1 | | 6/1998 |

OTHER PUBLICATIONS

Taiwan Patent Office, "Office Action for TW 099135945," Aug. 13, 2015.

* cited by examiner (a)          (b)

METHOD FOR PRODUCING PLASTIC LENS

RELATED APPLICATIONS

The present application is National Phase of International Application No. PCT/JP2010/006293 filed Oct. 25, 2010, and claims priority from Japanese Application No. 2009-247924 filed Oct. 28, 2009.

TECHNICAL FIELD

The invention relates to a method for producing plastic lens in which a plurality of plastic lenses having different optical surface shapes is simultaneously molded by a single molding die.

BACKGROUND ART

As the method for molding a plastic lens for eyeglasses, an injection compression molding method using a thermoplastic resin such as a polycarbonate resin or a methacrylic resin is known. For example, Patent Document 1 discloses one example of such injection compression molding method. In this method, an attempt is made to suppress optical strain or lowering of profile irregularity which occurs due to the shrinkage of a resin by further compressing the resin filled in the cavities of a mold by injection.

Further, as the method for producing a plastic lens for eyeglasses, a method is known in which a lens is molded as a semi-finished product of which the thickness is larger than the thickness of a finished product, and this semi-finished product, which is called as the semi-finished lens, is then shaped into a final product in the post process.

This method is mainly used in the production of a progressive refractive power lens used for bifocal glasses. Many of progressive refractive power lenses are produced by a method in which a plurality of semi-finished lenses which is molded such that they have different optical shapes is prepared in advance, an appropriate lens is selected from these lenses according to the prescription made for a user, and the lens is processed in a final shape such that the prescription is satisfied.

RELATED ART DOCUMENTS

Patent Document

Patent Document 1: JP-A-2000-6216

SUMMARY OF THE INVENTION

Problems to be Solved by the Invention

In the meantime, in the production of a progressive refractive power lens, a lens is designed taking into consideration not only the distance-vision power but also addition power (ADD). The optimum prescription differs according to the user, and even in the case of the same user, the optimum prescription for the left eye differs from that for the right eye. As mentioned above, by preparing a progressive refractive power lens from a semi-finished lens, the range in which it can correspond to the optimum prescription is widened. However, if the range is further widened so that it can correspond to all prescriptions, the type of a semi-finished lens to be prepared is increased significantly.

In molding such a semi-finished lens, if it is used frequently, the production efficiency thereof can be increased by molding a plurality of semi-finished lenses simultaneously by using a single molding die. In the case of a semi-finished lens which is not used so frequently, it is not preferable to mold a plurality of such lenses simultaneously in respect of stock control.

Therefore, in order to respond to the production of various types of lenses in a small quantity regardless of the frequency in use, by simultaneously molding a plurality of plastic lenses having different optical surface shapes in a single molding die, the production efficiency is expected to be enhanced.

Patent Document 1 discloses an example in which two plastic lenses are molded. However, this example is given on the assumption that plastic lenses having the same shapes are molded. In such a conventional technology, if an attempt is made to mold a plurality of plastic lenses having different optical surface shapes simultaneously in a single molding die, a sufficient molding accuracy cannot be obtained due to variations in pressure-keeping state during molding between a thick region and a thin region, for example.

The inventors of the invention made intensive studies. As a result, they have found that, by designing the cavity of a molding die such that each of the plastic lenses to be molded has the same volume, a plurality of plastic lenses can be simultaneously molded without impairing the molding accuracy even though they have different optical surface shapes. The invention has been made based on such a finding.

That is, it is an object of the invention to provide a method for producing plastic lenses in which a plurality of plastic lenses having different optical surface shapes can be molded simultaneously in a single molding die without impairing the molding accuracy, and an injection compression molding apparatus used in such a method.

Means for Solving the Problems

The method for producing a plastic lens according to the invention is a method in which, when a plurality of plastic lenses having different optical surface shapes are molded simultaneously in a single molding die, cavities are designed such that each of the plastic lenses to be molded has the same volume, and a raw material resin is filled in the cavities by injection and is molded into a predetermined lens shape.

Further, the injection compression molding apparatus according to the invention is an injection compression molding apparatus for molding a plurality of plastic lenses having different optical surface shapes simultaneously in a single mold by subjecting a raw material resin filled in cavities to compression by pressurization, wherein the volume of the cavity formed when the molding die is closed becomes a volume obtained by adding a compression allowance to the volume of a plastic lens to be molded, the volume of the cavity is allowed to be variable when clamping, and the cavities are designed such that each of the plastic lenses to be molded has the same volume. In the invention, the plastic lenses are molded to have the same diameters, and a plastic lens having a largest virtual average thickness when an assumption is made that the lens shape is set such that each of the lenses have the same central thickness among the plastic lenses is taken as the standard lens and the thickness of other plastic lens is corrected taking into consideration a difference between the virtual average thickness of the other plastic lens and the virtual average thickness of the standard lens such that the central thickness of the other plastic lens becomes larger than the central thickness of the standard lens by an amount corresponding to the difference, whereby each of the plastic lenses is allowed to have the same volume.

Advantageous Effects of the Invention

According to the invention, it is possible to mold a plurality of plastic lenses having different optical surface shapes simultaneously in a single molding die without impairing the molding accuracy.

MODE FOR CARRYING OUT THE INVENTION

A preferred embodiment of the invention will be explained with reference to the drawings.

First, the entire configuration of the injection compression molding apparatus according to this embodiment will be explained.

Figure 1:
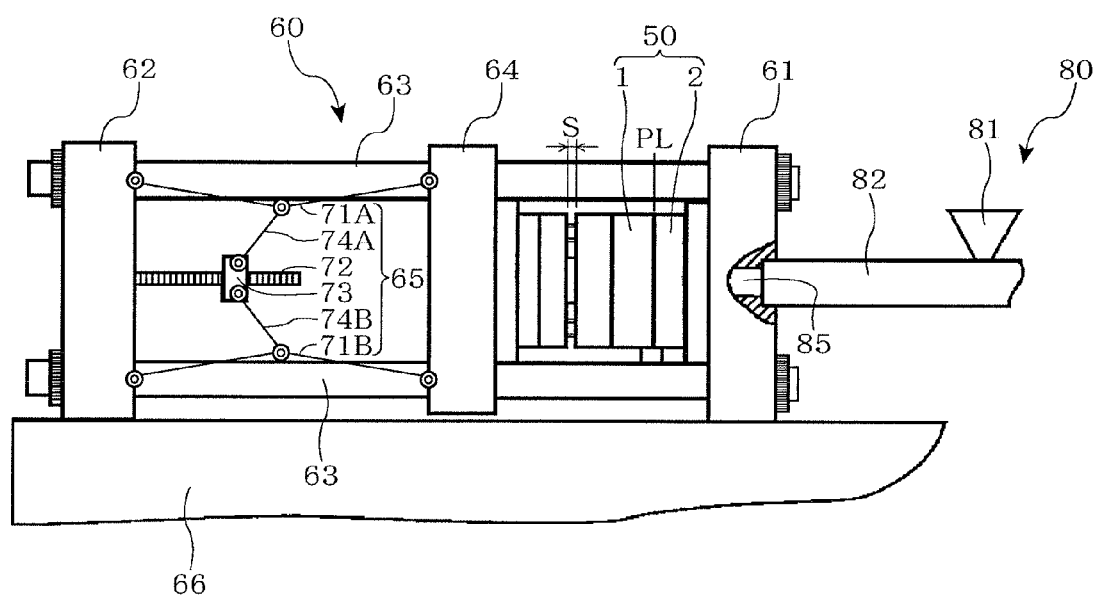
FIG. 1 is an explanatory schematic view of the embodiment of the injection compression molding apparatus of the invention.

FIG. 1 is an explanatory view showing an outline of the injection compression molding apparatus according to this embodiment. The injection compression molding apparatus shown in FIG. 1 has a molding die 50 having a movable die 1 and a fixed die 2 divided by a parting line PL, a mold clamping unit 60 which opens and closes and clamps the molding die 50 by a toggle link mechanism 65, and an injection apparatus 80 which plasticizes, kneads and weighs the raw material resin input from a hopper 81 by means of an injection cylinder unit 82 and injects the resin from a nozzle 85.

In FIG. 1, the vicinity of the nozzle 85 of the injection apparatus 80 is shown in a cut-way manner. As the raw material resin, a thermoplastic resin such as a polycarbonate resin or an acrylic resin which is commonly used in the molding of the plastic lens of this type can be used.

In the mold clamping unit 60, between a fixed die plate 61 and a rear plate 62 which are vertically arranged on a frame 66 with a prescribed interval therebetween, a plurality of tie bars 63 are installed, so that a movable die plate 64 can be moved with the guide of the tie bar 63. Between the fixed die plate 61 and the movable die plate 64, the molding die 50 is provided, and between the rear plate 62 and the movable die plate 64, the toggle link mechanism 65 is provided.

Due to such a configuration, when the toggle link mechanism 65 is driven, the movable die plate 64 moves back and forth with the guide of the tie bar 63, and with this movement, the opening and closing, as well as clamping of the molding die 50 are conducted.

Here, in the toggle link mechanism 65, with the rotation of a ball screw 72 which is connected to a motor (not shown), a crosshead 73 which is screwed moves along a ball screw 72. When the crosshead 73 moves towards the movable die plate 64, by connection links 74A and 74B, the toggle links 71A and 71B extend linearly, whereby the movable die plate 64 moves (advances) such that it closes to the fixed die plate 61. On the contrary, when the crosshead 73 moves towards the rear plate 62, the toggle links 71A and 71B are bent inwardly by the connection links 74A and 74B, whereby the movable die plate 64 moves (retracts) such that it is away from the fixed die plate 61.

Next, an explanation is made on the molding die 50 provided in the injection compression molding apparatus according to this embodiment.

Figure 2:
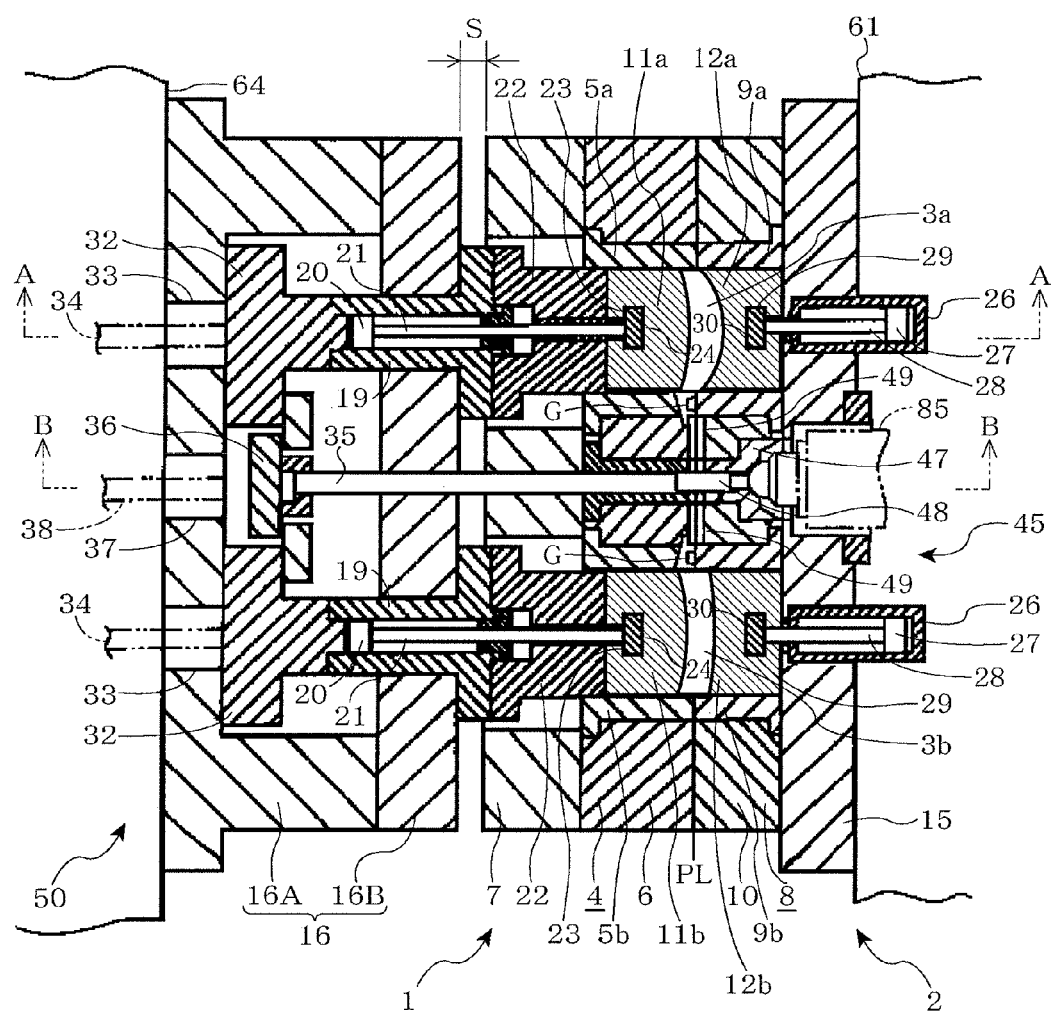
FIG. 2 is a cross-sectional schematic view of a molding die provided in the embodiment of the injection compression molding apparatus.
Figure 3:
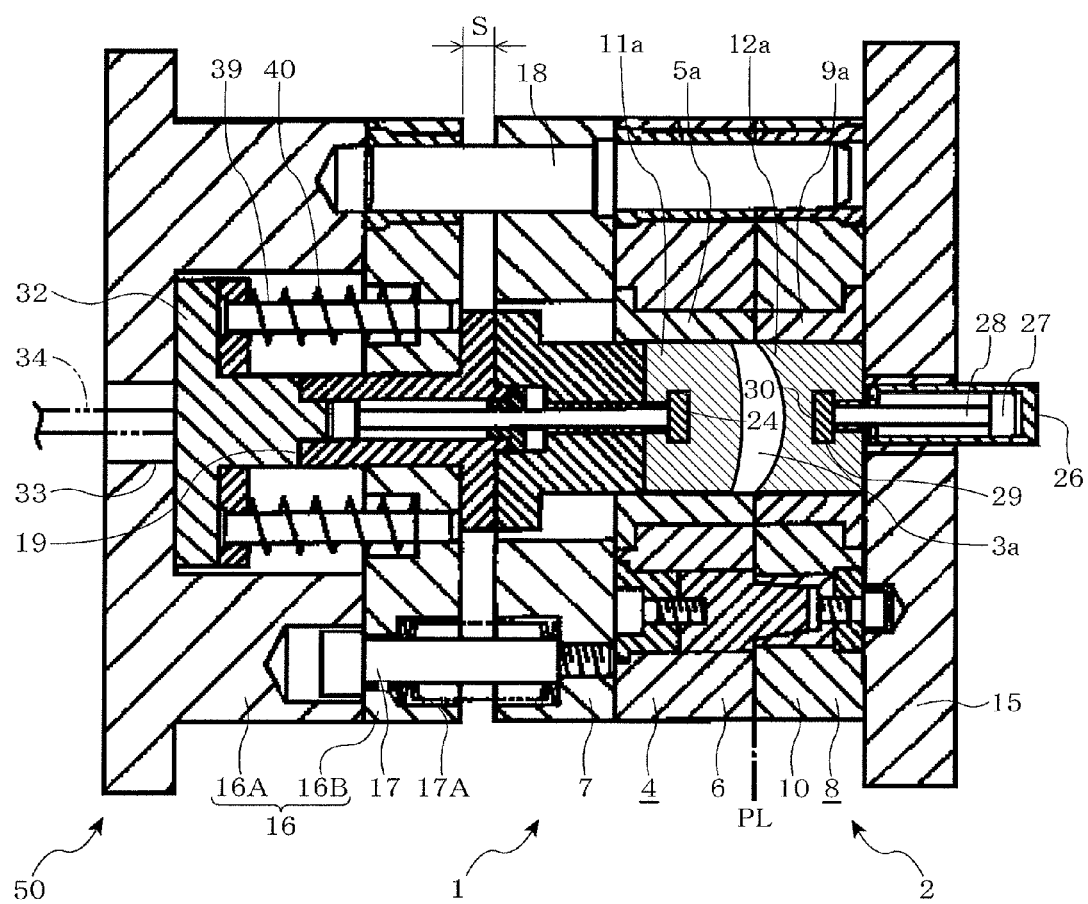
FIG. 3 is a cross-sectional view obtained by taking along the line A-A in FIG. 2.
Figure 4:
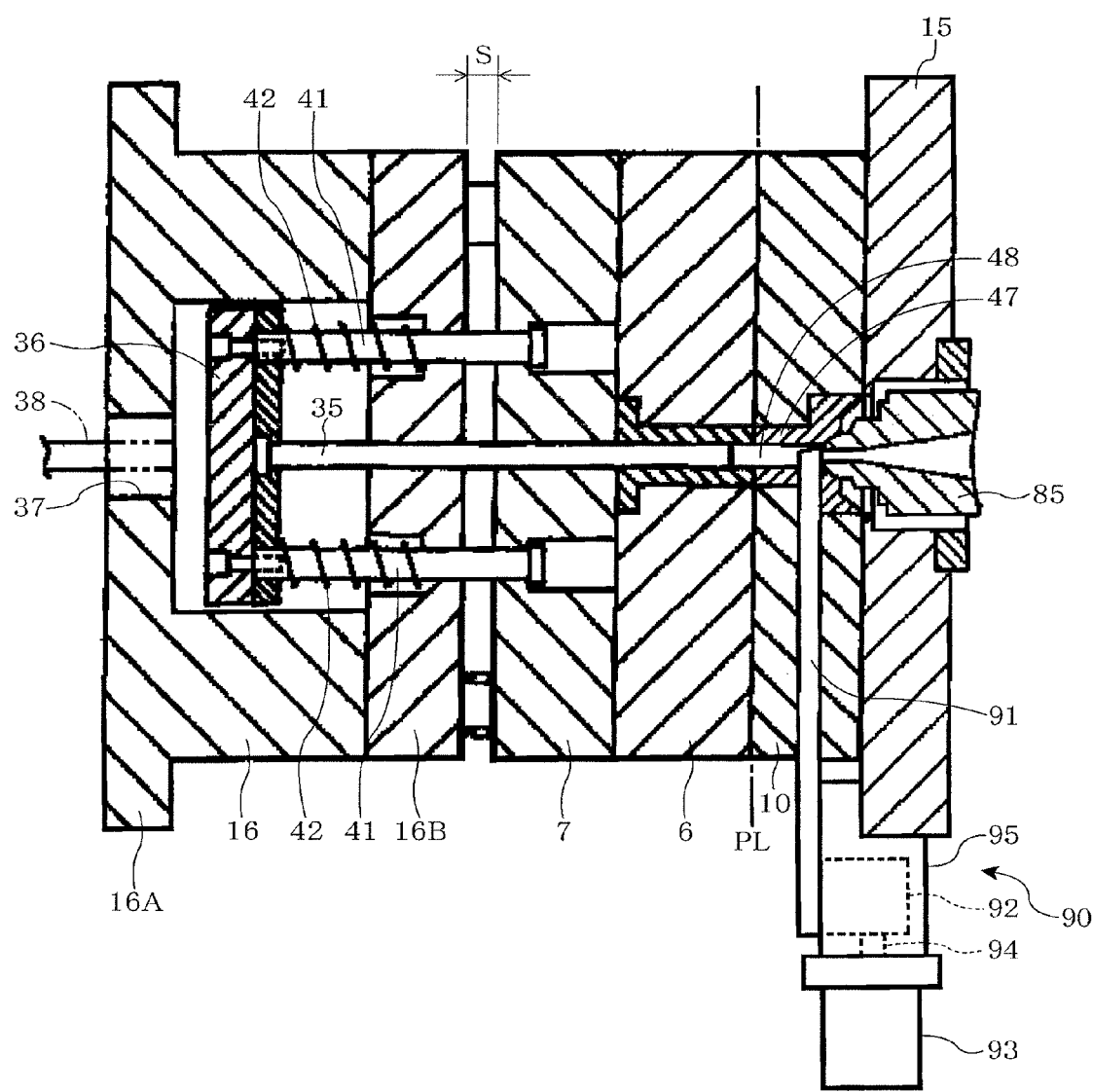
FIG. 4 is a cross-sectional view obtained by taking along the line B-B in FIG. 2.

FIG. 2 is a cross-sectional view of the molding die 50 provided in the injection compression molding apparatus shown in FIG. 1, which is taken along a plane which passes the center axis of the molding die 50 and is vertical to the sheet. FIG. 3 is a cross-sectional view obtained by taking along the line A-A in FIG. 2 and FIG. 4 is a cross-sectional view obtained by taking along the line B-B in FIG. 2.

In this example shown in these figures, a mold main body 4 of the movable die 1 is fixed to the movable die plate 64 through a mold-installing member 16, and a mold main body 8 of the fixed die 1 is fixed to the fixed die plate 61 through a mold-installing member 15. Due to such a configuration, the molding die 50 can be installed between the fixed die plate 61 and the movable die plate 64 of the mold clamping unit 60.

The mold main body 4 of the movable mold part 1 is provided with two insert guide members 5a and 5b and a mold plate 6 and a mold plate 7 supporting them. Inside the insert guide members 5a and 5b, an insert 11a and an insert 11b as the cavity forming member are received. In the insert 11a and the insert 11b, a molding surface corresponding to one surface of the plastic lenses to be molded (in the shown example, the surface of the concave side) is formed.

On the other hand, the mold main body 8 of the fixed die 2 is provided with two insert guide members 9a and 9b and a mold plate 10. The two insert guide members 9a and 9b are supported by the mold plate 10 and the mold-installing member 15. Inside the insert guide members 9a and 9b, an insert 12a and an insert 12b as the cavity-forming member are received. In the insert 12a and the insert 12b, a molding surface corresponding to the other surface of the plastic lenses to be molded is formed (in the shown example, the surface of the convex side).

In the molding die 50 having the movable die 1 and the fixed die 2, between the movable die 1 and the fixed die 2, a cavity 3a and a cavity 3b containing the molding surfaces which are respectively formed on the insert 11a and the insert 11b on the side of the movable die 1 and the insert 12a and the insert 12b on the side of the fixed die 2.

Between the movable die 1 and the fixed die 2, together with the cavities 3a and 3b, a runner 49, as a passage for the resin, which is connected to each of the cavities 3a and 3b through the gate G is formed. On the mold plate 10 of the fixed plate 2, a sprue bush 47 forming a sprue 48 which is connected to the runner 49 at the right angle is installed.

In this embodiment, in molding a plurality of (two in the shown example) plastic lenses simultaneously in a single molding die 50, the cavities 3a and 3b are designed such that the volumes of the plastic lenses to be molded become the same. This will be explained later.

Here, in the mold-installing member 16 on the side of the movable die 1, a hydraulic cylinder 19 is provided corresponding to each of the insert 11a and the insert 11b, and a piston rod 21 connected to the piston 20 is penetrated through a back insert 22 which is fixed to one end of the hydraulic cylinder 19. A T-shaped clamping member 23 provided at the tip of each of the piston rods 21 is detachably engaged with a T-shaped groove 24 formed on the back surface (the surface opposite to the surface at which the molding surface is formed) of the insert 11a and the insert 11b.

Due to such a configuration, in the state where the molding die 50 is opened, the piston rod 21 of each hydraulic cylinder 19 is moved forward to allow the T-shaped clamp member 23 provided at the tip of each of the piston rod 21 to be protruded from the insert guide members 5a and 5b, whereby the insert 11a and the insert 11b can be exchanged according to the plastic lens to be molded. If the piston rod 21 of each hydraulic cylinder 19 is retracted, the insert 11a and the insert 11b installed in the T-shaped clamping member 23 are received in the inside of the insert guide members 5a and 5b.

Similarly, in a mold-installing member 15 on the side of the fixed mold part 2, a hydraulic cylinder 26 is provided corresponding to each of the insert 12a and the insert 12b. The piston rod 28 connected to the piston 27 is penetrated through the mold-installing member 15. Then, the T-shaped clamping member 29 provided at the tip of each of the piston rods 28 is detachably engaged with the T-shaped groove 30 formed on the back surface (the surface opposite to the surface on which the molding surface is formed) of the insert 12a and the insert 12b.

Due to such a configuration, in the state where the molding die 50 is opened, the piston rod 28 of each hydraulic cylinder 26 is moved forward to allow the T-shaped clamping member 29 provided at the tip of each of the piston rod 28 to be protruded from the insert guide members 9a and 9b, whereby the insert 12a and the insert 12b can be exchanged according to the plastic lens to be molded. If the piston rod 28 of each hydraulic cylinder 26 is retracted, the insert 12a and the insert 12b provided in the T-shaped clamping member 29 are received in the inside of the insert guide members 9a and 9b.

When the mold main body 4 of the movable die 1 is fixed to a movable die plate 64, as shown in FIG. 3, the mold main body 4 is installed in the mold-installing member 16 formed of a first member 16A and a second member 16B by means of a bolt 17. At this time, between the mold main body 4 of the movable die 1 and the mold-installing member 16, a plurality of disc springs 17A, which are inserted in the outer periphery of the bolt 17 are interposed, whereby a gap S is formed between the mold main body 4 of the movable die 1 and the mold-installing member 16.

This gap S is closed by a mechanism in which, after the molding die 50 is closed, the movable die plate 64 is further advanced, and the mold-installing member 16 which is guided by a guide pin 18 is pressed against the elastic force of the disc spring 17A. With this closing, in the shown example, each of the hydraulic cylinder 19 provided in the mold-installing member 16 presses the insert 11a and the insert 11b through a back insert 22. In this way, the volume of each of the cavity 3a and the cavity 3b at the time of clamping can be variable, and the raw material resin filled by injection in the cavity 3a and the cavity 3b can be compressed by pressurization by the insert 11a and the insert 11b.

A guide pin 18 is protruded to the side of the fixed die 2 so that the opening and closing operation of the molded part 50 is guided, and inserted through an insertion hole provided in the fixed die 2.

Further, on the other end of the hydraulic cylinder 19 provided in the mold-installing member 16 on the side of the molded part 1, a pressure-receiving member 32 is installed. When an eject rod 34 which is inserted from a hole 33 formed in the mold-installing member 16 presses the pressure-receiving member 32, the hydraulic cylinder 19, the back insert 22 and the insert 11 are also pressed, whereby lenses molded within the cavity 3 are pushed out.

At the same time, in the middle of the mold-inserting member 16, an eject pin 35 is arranged such that it can move back and forth in the direction which is in parallel with the opening and closing direction of the molding die 50. When a pressure-receiving member 36 provided in the eject pin 35 is pressed by the eject rod 38 which is inserted from the hole 37 formed in the mold-installing member 16, the eject pin 35 is pushed out.

Therefore, when opening the mold, a molded article can be taken out by advancing the eject rods 34 and 38.

As shown in FIG. 3, in the pressure-receiving member 32, the spring force of the spring 40 which is wound around the outer periphery of an eject return pin 39 acts in the left direction in FIG. 3. Further, as shown in FIG. 4, in the pressure-receiving member 36, the spring force of the spring 42 which is wound around the outer periphery of an eject return pin 41 acts in the left direction in FIG. 4. As a result, when the eject rods 34 and 48 are retracted, the pressure-receiving members 32 and 36 are retracted to return to the stand-by position.

As shown in FIG. 4, the molding die 50 is provided with a nozzle shut mechanism 90 which shuts a nozzle 85 of the injection apparatus 80. The nozzle shut mechanism 90 has a nozzle shut pin 91 as a blocking member which protrudes in the sprue 48 formed by the sprue bush 47. This nozzle shut pin 91 is connected to a piston rod 94 of a hydraulic cylinder 93 through a connection piece 92, and the hydraulic cylinder 93 is fixed to the mold-installing member 15 by means of a cylinder-installing plate 95. Due to such a configuration, if the hydraulic cylinder 93 is driven in the state where the nozzle 85 is pushed on the sprue bush 47, the nozzle shut pin 91 is protruded in the sprue 48 to block the nozzle 85, whereby the backflow of the raw material resin is prevented.

In this embodiment, by using the injection compression molding apparatus as mentioned above, a plurality of plastic lenses having different optical surface shapes are molded simultaneously in the single molding die 50. At this time, as mentioned above, the cavities 3a and 3b formed in the molding die 50 are designed such that each of the plastic lenses to be molded has the same volume. One example of the procedure for allowing each of the plastic lenses to be molded to have the same volume will be explained below. The plastic lens molded in this embodiment is a meniscus lens having a convex surface and a concave surface. More specifically, it is a lens for eyeglasses to be molded as a semi-finished lens, in which the convex surface is molded in different optical surface shapes, and the concave surface is molded as the common concave surface.

For the sake of convenience, a plastic lens molded by the cavity 3a is taken as the first lens as the object of molding and a plastic lens molded by the cavity 3b is taken as the second lens as the object of molding.

At first, the optical surface shape of each lens is determined based on the lens design information of the first lens as the object of molding and the second lens as the object of molding which are to be molded simultaneously. For example, in the case of a progressive refractive power lens, the lens design information regarding the optical surface shape include, base curve, the near-vision power and the distance-vision power, addition power, and the optical surface shape of each lens is determined by them. At this time, it is preferred that the optical surface shape of each lens be formed from the same base curve.

Further, the thickness is determined taking into consideration a process allowance which is needed to finish the lens into a final shape, and then the temporal lens shapes of the first lens as the object of molding and the second lens as the object of molding are set such that the lenses have the same diameter, and the same central thickness CT.

Figure 5:
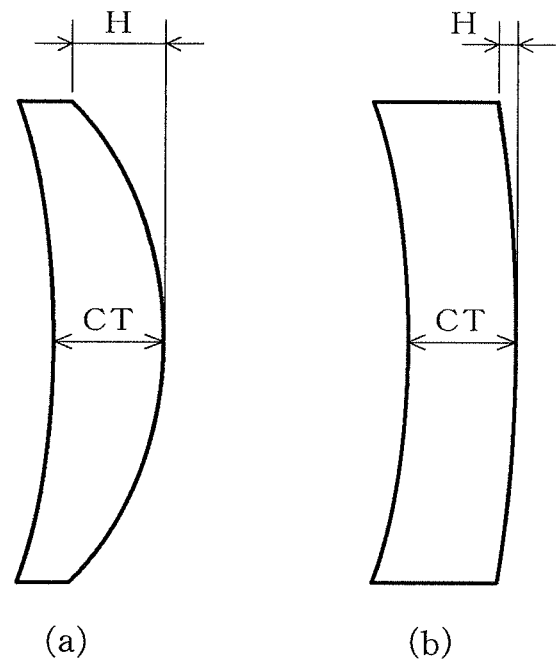
FIGS. 5(a) and 5(b) are explanatory views showing an example of the lens shape.

Here, for the first lens as the object of molding and the second lens as the object of molding which are simultaneously molded in this embodiment, the example of the lens shapes which is temporarily set is shown in FIG. 5.

The example shown in FIG. 5($a$) is the first lens as the object of molding and the example shown in FIG. 5($b$) is the second lens as the object of molding.

From the lens shapes of the first lens as the object of molding and the second lens as the object of molding, which are temporarily set, the average thickness thereof, i.e. the virtual average thickness when an assumption is made that the lens shape is set such that each of the lenses have the same central thicknesses CT, is obtained. The lens which has a largest virtual average thickness is taken as the standard lens. In the example shown in FIG. 5, the second lens as the object of molding shown in FIG. 5($b$) is the standard lens. For this second lens as the object of molding, the cavity 3$b$ is designed based on the lens shape which is set here.

Figure 6:
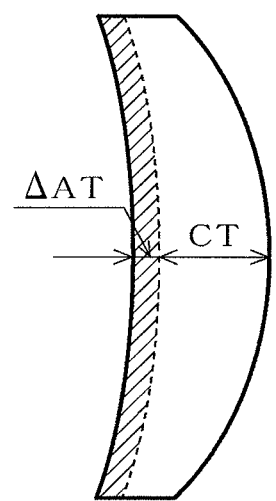
FIG. 6 is an explanatory view showing an example in which the thickness of the lens is corrected.

On the other hand, for the other plastic lens, i.e. the first lens as the object of molding, as shown in FIG. 6, the thickness of the first lens as the object of molding is corrected by taking into consideration a difference $\Delta AT$, which is the difference between the virtual average thickness of the first lens as the object of molding and the virtual average thickness of the second lens as the object of molding, such that the central thickness CT of the first lens as the object of molding becomes larger than the central thickness CT of the second lens as the object of molding by an amount corresponding to the difference $\Delta AT$. The cavity 3$a$ is designed based on the shape of the first lens as the object of molding at this time.

By designing the cavity 3$a$ and the cavity 3$b$ for molding the first lens as the object of molding as the other plastic lens and the second lens as the object of molding as the standard lens in the above-mentioned manner, each of the plastic lenses to be molded can have the same volume.

In the example shown in FIG. 6, the part of which the thickness is corrected is shown in slash lines.

Next, in forming the cavity 3$a$ and the cavity 3$b$ designed in this way, the positions of inserts 11$a$ and 11$b$ and inserts 12$a$ and 12$b$ as the cavity-forming members are determined.

For this purpose, at first, the lens shape of the first lens as the object of molding and the lens shape of the second lens as the object of molding are compared. Of these lenses, a lens in which the height H from the edge of the convex surface along the optical axis to the center of the lens is largest is selected. At this time, if the base curves of the optical surface shape formed in the first lens as the object of molding and the second lens as the object of molding are the same, one having a largest addition power is selected.

When the lens shape of the first lens as the object of molding and the second lens as the object of molding in this embodiment are compared, the first lens as the object of molding has a larger height H, which is the height from the edge of the concave surface along the optical axis to the center of the lens (see FIG. 5). Therefore, in this embodiment, the first lens as the object of molding is selected.

Figure 7A:
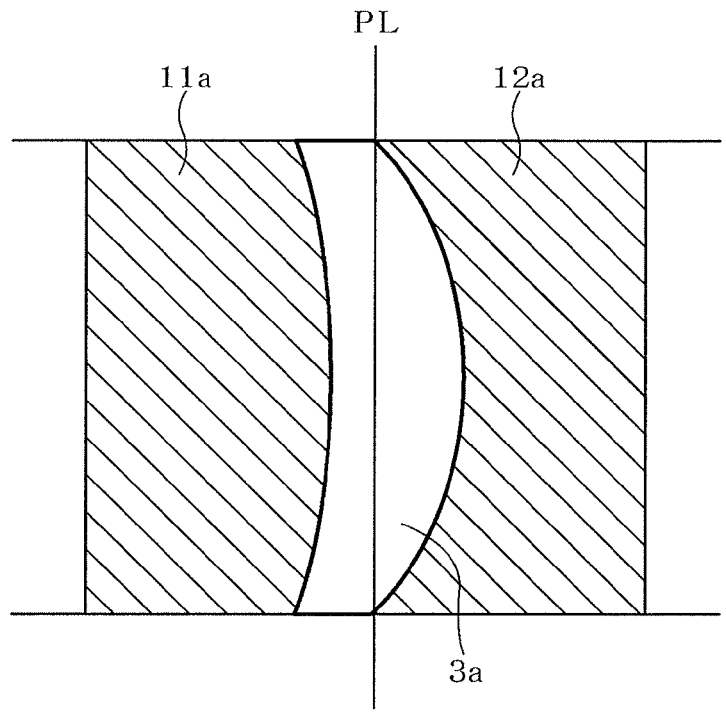
FIGS. 7A and 7B are explanatory views showing an example of the cavity which is designed such that each of the plastic lenses to be molded has the same volume.

In the cavity 3$a$ which molds the first lens as the object of molding, as shown in FIG. 7A, the insert 12$a$ is arranged such that the peripheral edge of the molding surface of the insert 12$a$ which molds the concave side of the first lens as the object of molding is positioned on the parting line.

Further, the insert 11$a$ is arranged such that it is away from the insert 12$a$ so that the molding surfaces thereof are separated by a distance corresponding to the thickness thereof, based on the lens shape of the first lens as the object of molding. In this way, the positions of the insert 11$a$ and the insert 12$a$ forming the cavity 3$a$ which molds the first lens as the object of molding are determined.

Figure 7B:
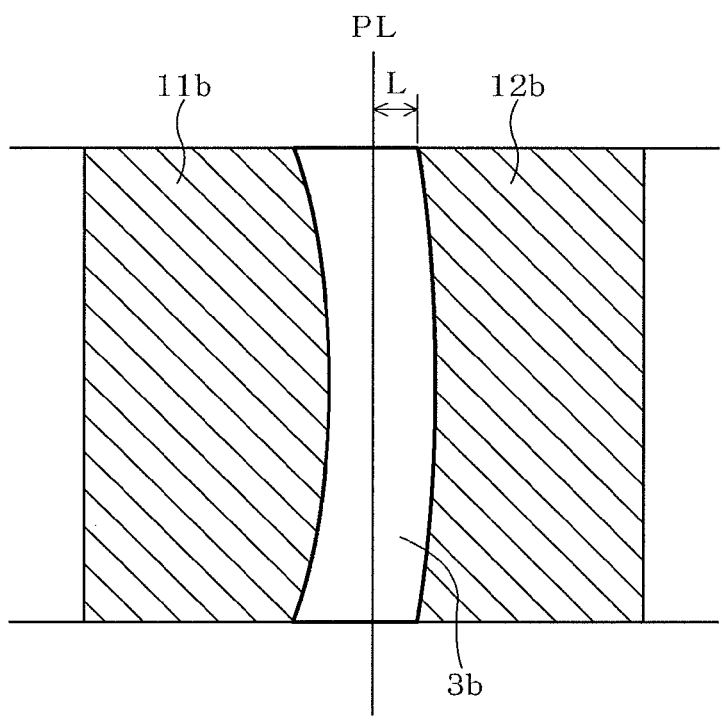

On the other hand, in the cavity 3$b$ which molds the second lens as the object of molding, as shown in FIG. 7B, the insert 11$b$ is positioned in the same way as that of the insert 11$a$ so that the structure of the mold which molds the convex surface thereof is allowed to be common in all of the cavities 3$a$ and 3$b$. If the position of the insert 11$b$ is determined, based on the lens shape of the second lens as the object of molding, the position of the insert 12$b$ is determined such that the molding surfaces thereof are separated by a distance corresponding to the thickness. As a result, the positions of 11$b$ and 12$b$ forming the cavity 3$b$ which molds the second lens as the object of molding are determined.

Due to such a configuration, in the cavity 3$b$ which molds the second lens as the object of molding, the outer peripheral edge of the molding surface formed in the insert 12$b$ which molds the convex side of the second lens as the object of molding is prevented from being protruded from the parting line PL. If the outer peripheral edge of the molding surface formed in the insert 12$b$ is protruded from the parting line PL, when the opening and closing of the molding die 50 are conducted, it is considered that the protruded part is caught, thereby to adversely affect the opening and closing operations. However, such defect may be eliminated.

Here, when taking into consideration mold-releasing properties of a molded article after the molding, an increase in the volume of the cavity in the fixed die 2 is not preferable. Therefore, the distance L between the outer peripheral edge formed in the insert 12$b$ and the parting line PL is preferably within 2 mm.

In this embodiment, a raw material resin is filled by injection in the thus designed cavities 3$a$ and 3$b$ to be molded into a predetermined lens shape. The specific embodiment thereof will be explained.

At first, the toggle link mechanism 65 is driven to allow the crosshead 73 to be advanced. As a result, the molding die 50 is closed. At this time, after the movable die 1 and fixed die 2 are in close contact on the parting line PL, the crosshead 73 is further advanced to appropriately adjust the gap S formed between the mold main body 4 of the movable die 1 and the mold-installing member 16, the volumes of the cavity 3$a$ and the cavity 3$b$ formed between the movable die 1 and the fixed die 2 becomes the volume which is obtained by adding a compression allowance to the volume which is set in the above-mentioned manner, i.e. the volume of the plastic lens as the object of molding is expanded in an amount corresponding to the compression allowance.

Next, the raw material resin which is weighed in a predetermined amount is injected from a nozzle 85 of the injection apparatus 80, and filled in the cavity 3a and the cavity 3b through the sprue 48, the runner 49 and a gate G. At this time, the raw material resin is weighed such that it will be an amount in which the volume of the sprue 48 and the volume of the runner 49 are added to the volume of the plastic lens to be molded.

Then, immediately before the completion of filling by injection of the raw material resin, the crosshead 73 is further advanced. After completion of the filling by injection of the raw material resin, the nozzle shut pin 91 is immediately protruded in the sprue 48 by the nozzle shut mechanism 90, whereby the nozzle 85 is shut. As a result, the raw material resin is sealed in the molding die 50 in the state where it is compressed by pressurization.

Then, the raw material resin sealed within the molding die 50 in the state it is compressed by pressurization is cooled. Then, the raw material resin in the cavity 3 solidifies and shrinks as cooling proceeds in the state where the resin is compressed by pressurization, and as a result, a plastic lens with a predetermined volume is molded. With the shrinkage of the raw material resin, the volumes of the cavity 3a and the cavity 3b are decreased, and the plastic lenses are molded such that each of the plastic lenses has the same volume. That is, the volumes of the cavity 3a and the cavity 3b which are designed as mentioned above are designed based on the volumes at this time.

Thereafter, the crosshead 73 of the toggle link mechanism 65 is retracted to open the molding die 50. At the time of this opening, the eject rods 34 and 38 are advanced, whereby a molded article 101 which is molded with the form as shown in FIG. 8 is taken out.

Figure 8:
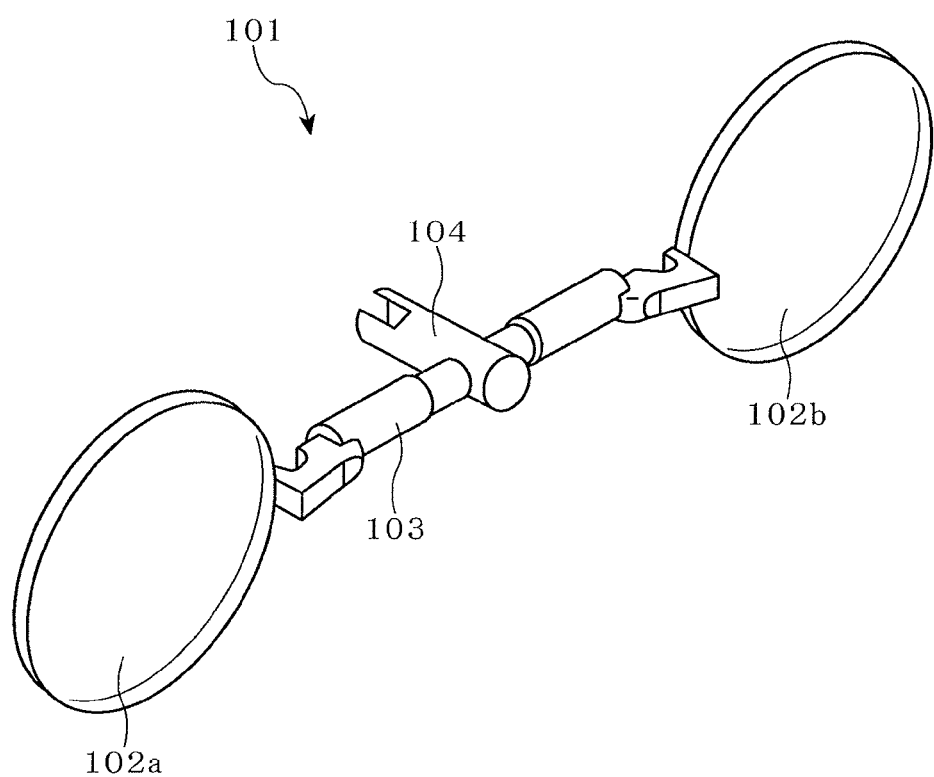
FIG. 8 is an explanatory view showing an example of a molded article to be obtained by molding in the embodiment of the method for producing a plastic lens according to the invention.

Here, the molded article 101 shown in FIG. 8 is formed of a first lens as the object of molding 102a and a second lens as the object of molding 102b which are respectively molded by the cavities 3a and 3b, a connection part 103 molded by the runner 49 and a bar-shaped part 104 molded by the sprue 49. As mentioned above, in this embodiment, the first lens as the object of molding 102a and the second lens as the object of molding 102b are molded as a semi-finished lens, and after it is taken out from the molding die 50, it is subjected to a post treatment such as an abrasion proof treatment, if necessary, and then finished into a final shape to be put on the market as the lens for eyeglasses.

In this embodiment, a plurality of plastic lenses 102a and 102b are simultaneously molded in one molding die 50. At this time, by designing the cavities 3a and 3b such that each of the plastic lenses 102a and 102b to be molded has the same volume, the plastic lenses 102a and 102b having different shapes in which good optical surface shape is molded can be simultaneously molded without impairing the molding accuracy.

The reason therefor is assumed to be as follows. By designing the cavities 3a and 3b such that each of the plastic lenses 102a and 102b to be molded has the same volume, the same amount of the raw material resin is equally distributed to each of the cavities 3a and 3b.

In this embodiment, by blocking the nozzle by allowing a shutting member to be protruded in the sprue after the injection of a predetermined amount of the raw material resin, the backflow of the raw material resins filled in the cavity 3a and the cavity 3b can be prevented. Then, with this state, by molding the plastic lenses by injection compression molding with the volume of the cavity being variable when clamping, a uniform pressure is applied to the raw material resin in the cavities, whereby a plurality of plastic lenses having different optical surface shapes can be molded with a higher degree of accuracy.

EXAMPLES

The invention will be explained in more detail with reference to the following examples.

Example 1

For lens A and lens B having different optical surface shapes, each of temporal lens shape was designed such that the central thickness becomes 6.7 mm. The lens design information regarding the optical surface shapes of the lens A and the lens B were as follows:
(Lens A)
Base curve: 4.00, Distance-vision power: +4.47, Near-vision power: +5.47, Addition power: +1.0
(Lens B)
Base curve: 4.00, Distance-vision power: +4.47, Near-vision power: +7.47, Addition power: +3.0

From the temporal lens shapes of the lens A and the lens B, the virtual average thicknesses of them were obtained. As a result, the lens A had a virtual average thickness of 8.161 mm and the lens B had a virtual average thickness of 7.708 mm. Therefore, the lens A was taken as the standard lens, and the thickness of the lens B was corrected by taking into consideration a difference between the virtual average thicknesses of the both lenses such that the central thickness of the lens B becomes larger than the central thickness of the lens A by an amount corresponding to the difference (0.453 mm). Based on the shapes of the lens A and the lens B determined in this way, a molding die of which the cavities are designed for molding each lens was prepared.

By using the molding die thus prepared, the lens A and the lens B were simultaneously molded using a polycarbonate resin as the raw material resin. The same molding was repeated three times, whereby three pieces of each of the lens A and the lens B were molded. The lens which was molded at first is taken as the first molded article, the lens which was molded next is taken as the second molded article and the lens which was molded lastly is taken as the third molded article. The optical surface shapes of each lens were examined, and the results are shown in Table 1. As shown in Table 1, each lens had almost intended optical properties and was excellent in transcription.

Table 1 also shows the weight of each of the molded lens A and the molded lens B.

TABLE 1

|  | Type of lens | Distance-vision power | Near-vision power | Addition power | Weight (g) |
| --- | --- | --- | --- | --- | --- |
| First molded article | A | +4.49 | +5.49 | +1.00 | 58.6 |
|  | B | +4.48 | +7.52 | +3.04 | 58.7 |
| Second molded article | A | +4.48 | +5.50 | +1.02 | 58.7 |
|  | B | +4.48 | +7.52 | +3.04 | 58.6 |
| Third molded article | A | +4.49 | +5.51 | +1.02 | 58.7 |
|  | B | +4.48 | +7.53 | +3.05 | 58.7 |

The present invention is explained hereinabove with reference to preferred embodiments. The present invention is not limited to the embodiments as mentioned above, and it is needless to say various modifications are possible within the scope of the present invention.

For example, in the above-mentioned embodiment, an explanation is given by taking the example in which two plastic lenses are simultaneously molded. However, the invention can be applied to a case where three or more plastic lenses are simultaneously molded.

In addition, in the above-mentioned embodiment, an explanation is given by taking an example as eyeglasses. However, the plastic lens to be produced in the invention can be used in various applications other than eyeglasses.

INDUSTRIAL APPLICABILITY

The invention can be used as a technology of simultaneously molding a plurality of plastic lenses having different optical surface shapes in a single molding die.

EXPLANATION OF NUMERALS

1. Movable die
2. Fixed die
3a, 3b Cavities
48. Sprue
50. Molding die
80. Injection apparatus
85. Nozzle
90. Nozzle shut mechanism
91. Nozzle shut pin (blocking member)

The invention claimed is:

1. A method for producing a plastic lens wherein, when a plurality of plastic lenses having different optical surface shapes is molded simultaneously in a single molding die,
    cavities are designed such that each of the plastic lenses to be molded has a same volume, and
    a raw material resin is filled in the cavities by injection and is molded into a predetermined lens shape,
    the method comprising:
    setting temporal lens shapes of the plastic lenses such that the temporal lens shapes have a same diameter and a same central thickness,
    obtaining a virtual average thickness of the temporal lens shapes,
    taking a plastic lens having a largest virtual average thickness as a standard lens, and
    correcting a thickness of one or more of the other plastic lenses by taking into consideration a difference between a virtual average thickness of the one or more of the other plastic lenses and a virtual average thickness of the standard lens such that a central thickness of the one or more of the other plastic lenses becomes larger than a central thickness of the standard lens by an amount corresponding to the difference, whereby cavities for the plastic lenses to be molded have the same volume.

2. The method for producing a plastic lens according to claim 1, wherein the optical surface shape is formed from the same base curve.

3. The method for producing a plastic lens according to claim 1, wherein the plastic lenses are meniscus lenses having a convex surface and a concave surface.

4. The method for producing a plastic lens according to claim 3, wherein the plastic lenses are lenses for eyeglasses to be molded as a semi-finished lens, and a convex surface of one lens is molded in different optical surface shape from another plastic lens and the concave surface of the one lens is molded as a same concave surface as the another plastic lens.

5. The method for producing a plastic lens according to claim 3, wherein the molding die has a movable die and a fixed die divided by a parting line,
    in all of the cavities which mold the plastic lens, a structure of the mold which molds the concave surface is allowed to be common, and
    in a cavity which molds a plastic lens of which a height from the edge of the convex surface along an optical axis to a center of the lens is largest among the plastic lenses, a peripheral edge of the molding surface which molds the convex surface is allowed to be positioned on the parting line.

6. The method for producing a plastic lens according to claim 1, wherein, when the raw material resin injected from a nozzle of an injection apparatus is filled in the cavity through a resin passage including a sprue formed within the molding die, after the injection of a prescribed amount of the raw material resin, a blocking member is allowed to be protruded in the sprue, thereby to block the nozzle.

7. The method for producing a plastic lens according to claim 1, wherein the volume of the cavity formed when the molding die is closed becomes a volume obtained by adding a compression allowance to the volume of a plastic to be molded, and the plastic lens is molded by injection compression molding by allowing the volume of the cavity to be variable when clamping.

* * * * *